United States Patent
Hunt et al.

(10) Patent No.: US 7,289,027 B2
(45) Date of Patent: Oct. 30, 2007

(54) NETWORK MANAGEMENT USING SUPPRESSIBLE RFID TAGS

(75) Inventors: Christian Lee Hunt, Cary, NC (US); Vincent Mitchel Padua, Chapel Hill, NC (US); Robin Radez, Westport, CT (US); William Alexander Reichert, III, Buda, TX (US); Gregory Covert Smith, Raleigh, NC (US); Oriana Jeannette Williams, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 11/244,380

(22) Filed: Oct. 5, 2005

(65) Prior Publication Data
US 2007/0075863 A1  Apr. 5, 2007

(51) Int. Cl.
*G08B 13/14* (2006.01)
(52) U.S. Cl. .............. 340/572.1; 340/572.3; 340/679; 340/506; 709/223; 235/375
(58) Field of Classification Search ........... 340/572.1, 340/572.3, 679, 506–509; 709/223–224; 235/375–376
See application file for complete search history.

(56) References Cited

U.S. PATENT DOCUMENTS 5,949,335 A * 9/1999 Maynard ............... 340/572.1
6,025,780 A   2/2000 Bowers et al. ......... 340/572.3
6,249,227 B1 * 6/2001 Brady et al. ........... 340/572.1
7,219,834 B2 * 5/2007 Chang .................... 235/380
2006/0044113 A1 * 3/2006 Hashimoto et al. ...... 340/10.1
2006/0214794 A1 * 9/2006 Wang ..................... 340/572.1

OTHER PUBLICATIONS

Naef, W. "General Best Practices for Lapton Security", INFOCON, IN04-001, Jun. 8, 2004.
Juels, A. et al. "Soft Blocking: Flexible Blocker Tags on the Cheap", WPES '04, pp. 1-7, Washington, DC, Oct. 28, 2004.
Greenberg, S. et al. "Customizable Physical Interfaces for Interacting with Conventional Applications", UIST '02, vol. 4, Issue 2, pp. 31-40, Oct. 27-30, 2002.
AbuSafiya, M. et al. "Accommodating Paper in Document Databases", DocEng '04, pp. 155-162, Oct. 28-30.
Mesarina, Malena, "Demo Abstract: Automating Server Tracking for Data Centers", SenSys '04, p. 307, Nov. 3-5, 2004.

* cited by examiner

*Primary Examiner*—Jeffery Hofsass
*Assistant Examiner*—Hoi C. Lau
(74) *Attorney, Agent, or Firm*—David R. Irvin

(57) ABSTRACT

Methods and computer program products for managing a device connected to a network include querying the device using the network, querying the device using a simulated RFID tag, and querying the device using a suppressible RFID tag to determine status information about the device. A system for managing a device connected to a network comprises means for monitoring status of the device using the network, for receiving status information about the device reported by a simulated RFID tag, and for receiving status information about the device reported by a suppressible RFID tag.

12 Claims, 5 Drawing Sheets

NETWORK MANAGEMENT USING SUPPRESSIBLE RFID TAGS

RELATED APPLICATIONS

Attention is directed to the commonly assigned, co-pending U.S. patent application by the same inventors, entitled "Locating a Device in a Given State."

BACKGROUND

The present invention concerns the field of network management, and more particularly concerns using suppressible RFID tags to determine the status of network connected devices.

Network management applications often determine the status of remote devices such as computers attached to a network by querying the devices through the network. When the network fails and the application is unable to reach a device, however, this method provides no way to differentiate between failure of the monitored device and failure of the network.

One way around this shortcoming is to provide a second and separate network such as a wireless network that is used to carry status information about monitored devices. This is, of course, quite expensive. Another technique sometimes used is to sense the draw of electrical power by the monitored devices. This may be accomplished by placing so-called taps on the monitored devices' power supplies. If a monitored device fails to respond to status queries over the network, but the power supply remains healthy, it may be loosely inferred that the monitored device is working properly but the network has failed. The power tap technique is unable, however, to provide status information about a monitored device beyond the health of its power supply. This limitation may very well lead to an incorrect diagnosis of the problem at hand when a monitored device fails to respond to queries from the network management application via the network.

SUMMARY

Aspects of the invention include methods and computer program products for managing devices connected to networks by querying a device using the network, querying the device using a simulated RFID tag when a network management application is unable to reach the device using the network, and querying the device using a suppressible RFID tag to determine status information about the device when the network management application is unable to reach the device using the network and unable to reach the device using the simulated RFID tag. Other aspects of the invention include systems for managing devices connected to networks. Such systems comprise a network management application for monitoring status of a device using the network, for receiving status information about the device reported by a simulated RFID tag, and for receiving status information about the device reported by a suppressible RFID tag.

BRIEF DESCRIPTION OF THE SEVERAL VIEWS OF THE DRAWINGS

The invention may be better understood by reading the following detailed description together with the drawings, wherein.

DETAILED DESCRIPTION

Figure 1:
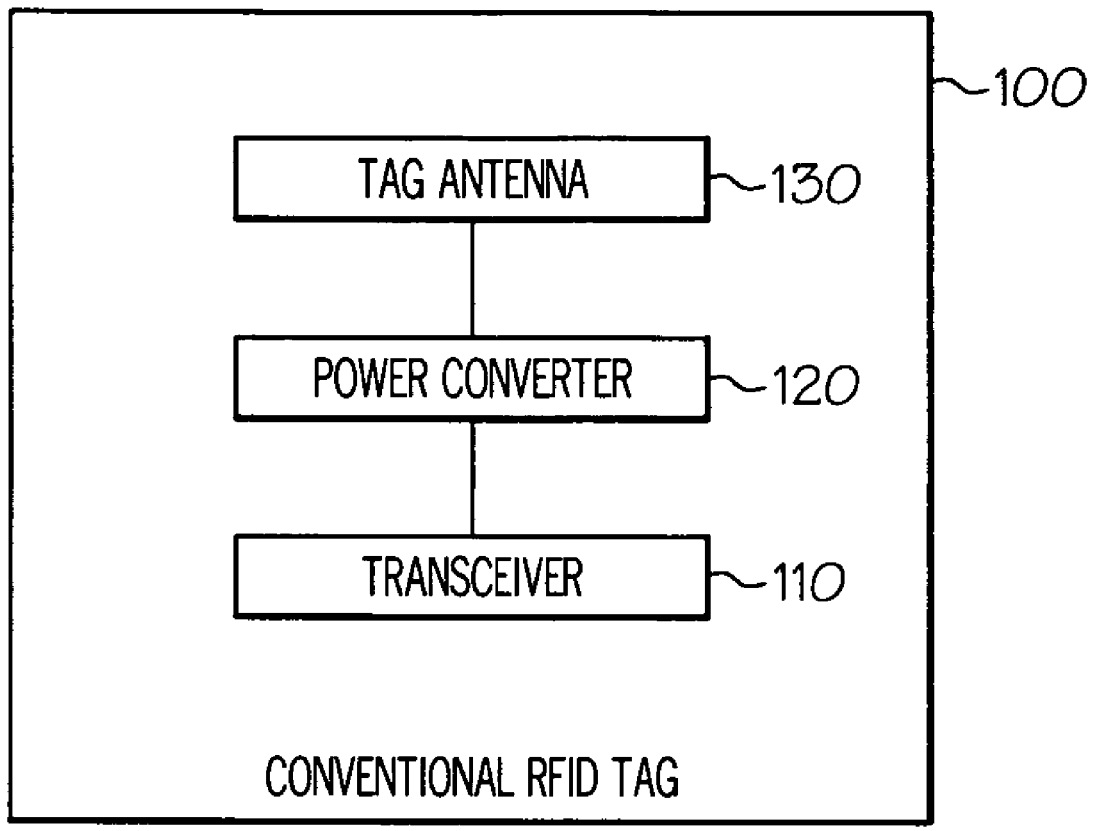
FIG. 1 shows a block diagram of a conventional RFID tag.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, aspects of the present invention may be embodied as a method, data processing system, or computer program product. Accordingly, aspects of the present invention may take the form of embodiments entirely in hardware, entirely in software, or in a combination of hardware and software referred to as circuits and modules.

Furthermore, aspects of the present invention may take the form of a computer program product on a computer-usable storage medium having computer-usable program code embodied in the medium. Any suitable computer-readable medium may be utilized, including hard disks, CD-ROMs, optical storage devices, magnetic storage devices, and transmission media such as those supporting the Internet or an intranet.

Computer program code for carrying out operations of the present invention may be written in an object oriented programming language such as Java, Smalltalk, or C++. However, the computer program code for carrying out operations of the present invention may also be written in conventional procedural programming languages, such as the C programming language. The program code may execute entirely on a single computer or distributed over a plurality of computers.

The present invention is described below with reference to flowchart illustrations and/or block diagrams of methods, apparatus (systems), and computer program products according to embodiments of the invention. It will be understood that blocks of the flowchart illustrations and diagrams may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart and/or block diagram block or blocks.

FIG. 1 shows a block diagram of a conventional RFID tag. This diagram is introduced mainly as a descriptive convenience to be used in clearly differentiating the suppressible RFID tag described below with reference to FIG. 2 from the conventional RFID tag of FIG. 1.

As shown in FIG. 1, a conventional RFID tag 100 comprises a transceiver 110, a power converter 120, and a tag antenna 130. As is well known to those skilled in the art, a conventional passive RFID tag receives electromagnetic energy through the tag antenna 130 when read or queried by a tag reader. The power converter 120, which may be, for example, a rectifier and a simple filter such as a capacitor, transforms the received energy into a form suitable to power the transceiver 110, in order that the transceiver 110 may respond to the tag reader. In contrast to passive RFID tags, active RFID tags may include an internal power source such as a small battery, which eliminates the need to power the transceiver 110 from energy received by the tag antenna 130. Since conventional RFID tags both passive and active are well known to those skilled in the art, no further elaboration will be given here.

A type of RFID tag called here a suppressible RFID tag will now be described with reference to FIGS. 2A-2B. Unlike a conventional RFID tag of the kind just described, which may respond to the tag reader whenever the tag is within range of the reader, a suppressible RFID tag may respond selectively to the tag reader, in dependence on a condition that is externally provided to the suppressible RFID tag. Thus, to say that a suppressible RFID tag responds selectively to queries from an RFID tag reader means that the suppressible RFID tag responds to queries from the tag reader, or does not respond to queries from the tag reader, depending on the state of a control signal.

Figure 2A:
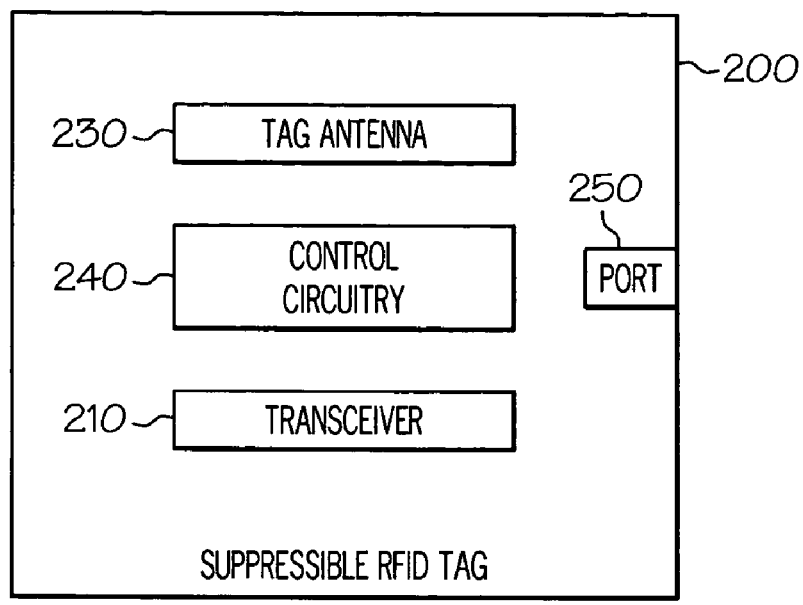
FIGS. 2A-2B show block diagrams of exemplary suppressible RFID tags.

FIG. 2A shows an exemplary structure of a suppressible RFID tag 200. In FIG. 2A, the suppressible RFID tag 200 comprises a transceiver 210, a tag antenna 230, control circuitry 240, and a port 250. The suppressible RFID tag 200 may be active or passive. In a preferred embodiment, the suppressible RFID tag 200 is passive, meaning that power for the transceiver 210 is derived from energy received from a tag reader using the tag antenna 230.

A control signal, which may be conveyed by the standard voltage levels that represent the logical binary states for an appropriate integrated circuit technology type, may be provided to the suppressible RFID tag 200 through the port 250. In this example, the port 250 may be a simple electrical connection. A galvanic electrical connection is not required, however, as the control signal may be input to the suppressible RFID tag 200 by, for example, inductive or capacitive coupling. If the suppressible RFID tag 200 is active rather than passive, the control signal may be multiplexed onto an electrical connection that powers the suppressible RFID tag 200 from an external source.

The control signal is provided to the control circuitry 240. Subject to the control signal, the control circuitry 240 effectively enables or suppresses the response of the transceiver 210 when the suppressible RFID tag 200 is queried by a tag reader. For example, if the control signal is a logical high, the control circuitry 240 may permit or enable the transceiver 210 to respond to a query from a tag reader. Conversely, if the control signal is a logical low, the control circuitry 240 may suppress or otherwise inhibit the response of the transceiver 210. Of course, the logic may differ from that just described.

Figure 2B:
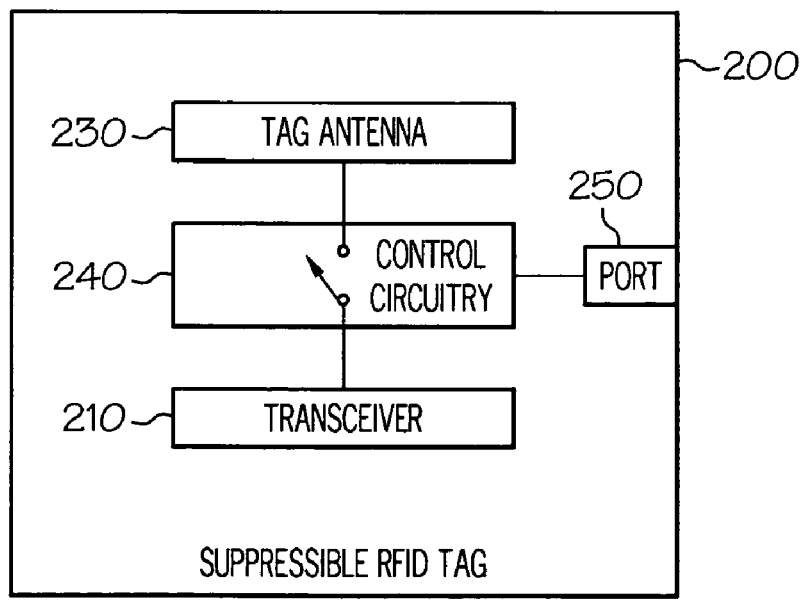

FIG. 2B shows an example of a suppressible RFID tag 200 with a particular kind of control circuitry 240. In this example, the control circuitry 240 comprises a switching device that, responsive to the control signal, makes and breaks a connection between the tag antenna 230 and the transceiver 210, so that an emission from the transceiver 210 can or cannot reach the tag antenna 230. The switching device may be, for example, a biased PIN diode, a field effect transistor (FET), a MEMS device, or the like; the control circuitry 240 or the port 250 may include an appropriate driver for the switching device.

In other embodiments, the switching device may have a single-pole-double-throw structure that connects the transceiver 210 to the tag antenna 230 in one state, and, in the other state, connects the transceiver 210 to a dummy load such as a strip resistor deposited within the suppressible RFID tag 200. In this embodiment, emissions from the transceiver 210 are radiated by the tag antenna 230, or suppressed by shunting them to ground through the resistor. Such a switching device can be easily implemented by a pair of diodes or transistors, as would be well known to those skilled in circuit design.

It is not a necessary condition of the invention that the mechanism for suppressing the output of the suppressible RFID tag 200 involve manipulating the RF path between the transceiver 210 and the tag antenna 230. Rather, in yet other embodiments of the suppressible RFID tag 200 the control circuitry 240 may make and break power to the transceiver 210, disable the transceiver 210 at intermediate points internal to the transceiver 210, and the like.

Figure 3:
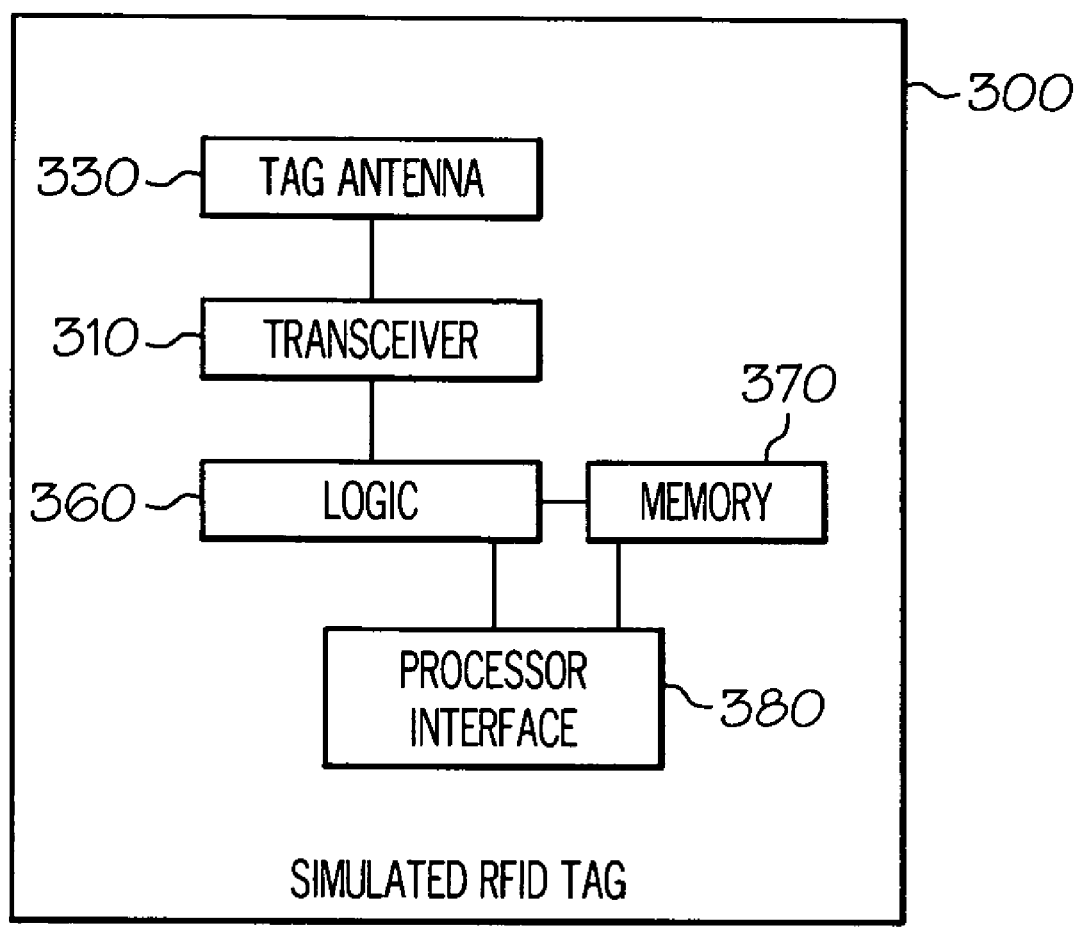
FIG. 3 shows a block diagram of a simulated RFID tag.

FIG. 3 shows exemplary structure of a simulated RFID tag 300. This is called a simulated RFID tag not because it must necessarily have all of the structure and attributes of a conventional RFID tag, although it may have some, but instead because the air interface of the simulated RFID tag 300 conforms to the formats and protocols of the RFID air interface. In practice, the simulated RFID tag 300 may indeed be a tag; it may also be an electronic assembly or subassembly of any kind, and may be integrated into other electronic assemblies or subassemblies. For example, the simulated RFID tag 300 may have the physical nature of a module or circuit card rather than a thin, flexible tag.

As shown in FIG. 3, the simulated RFID tag 300 comprises a tag antenna 330, a transceiver 310, logic 360, memory 370, and a processor interface 380. The tag antenna 330 and the transceiver 310 respond to enquiries by a tag reader much in the same way as the conventional tag antenna 130 and transceiver 110 of FIG. 1. Typically, however, the simulated RFID tag 300 has far greater capability to transfer information back to the tag reader than the conventional RFID tag 100 or the suppressible RFID tag 200. This capability is provided by the logic 360, which may be a programmable processor that interfaces to the transceiver 310 and which may control the operation of the transceiver 310, and the memory 370. The logic 360 and the memory 370 are connected to the processor interface 380, which may be operably connected to a device that is monitored by the simulated RFID tag 300. Due to the greater power requirements, a preferred embodiment of the simulated RFID tag 300 is active rather than passive, where power is supplied externally rather than by an internal battery. Here, power may be supplied by a device that the simulated RFID tag 300 monitors.

The monitored device may pass information to the memory 370 in the form of a portable data file. For example, a monitored device such as a computer may pass status information such as register contents, ab-end codes, resource utilization levels, and so forth, to the memory 370 as portable data files. The logic 360 reads the memory 370. When the simulated RFID tag 300 is queried by a tag reader, the simulated RFID tag 300 returns information from the portable data files to the tag reader, using RFID formats and protocols.

Figure 4:
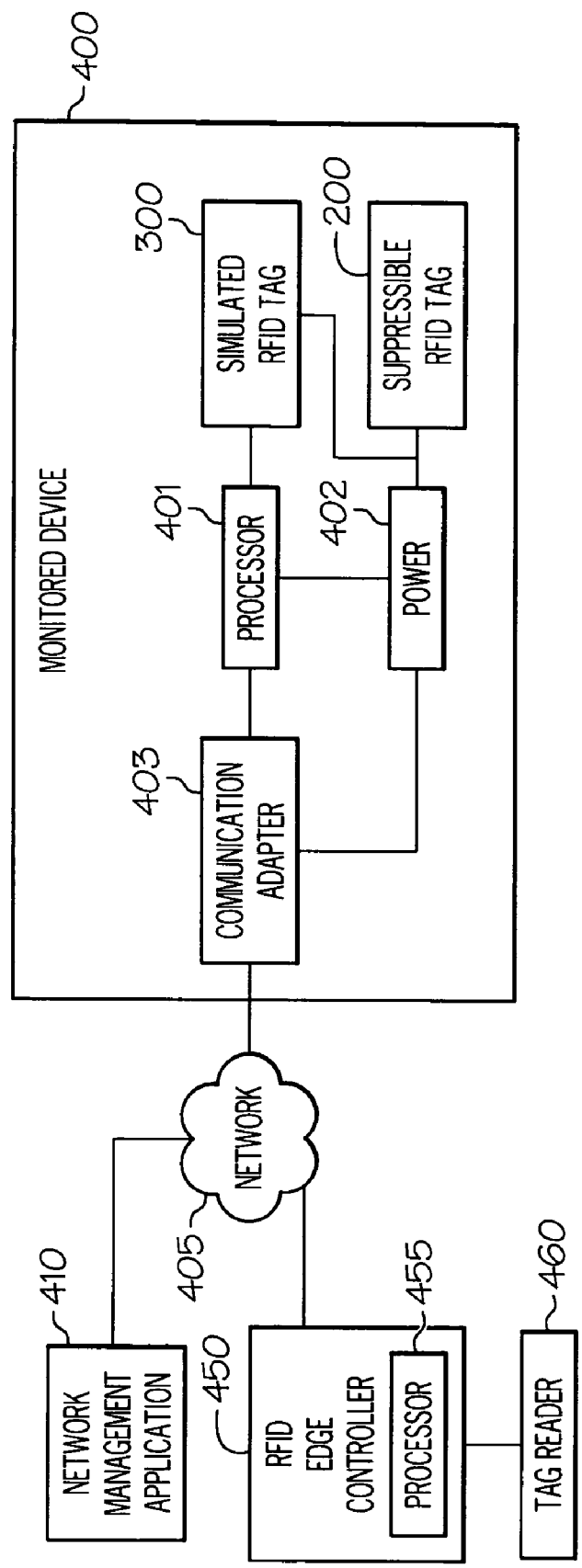
FIG. 4 shows aspects of a system for managing devices attached to networks.

FIG. 4 shows aspects of a system for managing a device attached to a network, where the method for managing uses a suppressible RFID tag 200 and a simulated RFID tag 300 in addition to the resources of the network. For descriptive clarity, the method will be explained here with reference to only one managed device; it should be understood that this is not a limitation of the invention, and that the invention applies as well to managing a plurality of monitored devices.

As shown in FIG. 4, a managed device, called here a monitored device 400, is attached to a network 405. The network 405 may be any kind of a network, such as a wide area network, a metropolitan area network, or a local area network, and may be public, private, or virtual. The network 405 may be or include the Internet or an intranet. A network management application 410 may execute on a processor (not shown in the interest of clarity) that is operably connected to the network 405. The network management application 410 may provide performance and availability management, configuration and inventory management, and so forth regarding the monitored device 400. The IBM Tivoli™ line of products, for example, provides such functions.

For descriptive clarity, FIG. 4 shows a skeleton RFID infrastructure of the networked-system type, comprising a tag reader 460, an edge controller 450, and a processor 455. Limitations of the exemplary skeleton system are not, however, limitations of the invention, as the invention applies to RFID infrastructures of other kinds and scopes as well. For example, the RFID infrastructure may be a much more elaborate infrastructure that is already in place for other purposes such as equipment tracking, and which may include a plurality of tag readers and edge controllers. Here, only in the interest of clarity, the purpose of the tag reader 460 is to query the suppressible tag reader 200 and the simulated RFID tag 300, and return their reports regarding status of the monitored device 400 to the edge controller 450. The edge controller 450 may provided the status reports, or information derived from the status reports, to the network management application 410.

In FIG. 4, the edge controller 450 communicates with the network management application 410 through the network 405. In other embodiments of the invention, the edge controller 450 and the network management application 410 may be integral, for example, meaning that the network management application 410 and the application programs of the edge controller 450 may run on the same processor, for example on the processor 455 of the edge controller 450.

As shown in FIG. 4, the monitored device 400 comprises a processor 401, a power supply 402, a communication adapter 403, which provides network connectivity for the monitored device 400, a suppressible RFID tag 200, and a simulated RFID tag 300.

The processor 401 may provide the principal functions of the monitored device 400, and may also control and coordinate the operation of the communication adapter 403, and the simulated RFID tag 300. The processor 401 passes status information regarding the status of the monitored device 400 to the simulated RFID tag 300. Status information may include register contents, ab-end codes, resource utilization levels, and so forth, and may be in the form of portable data files.

The power supply 402 provides power to the processor 401, the simulated RFID tag 300, and the communication adapter 403, and, as shown in this example, may provide power and a control signal to the suppressible RFID tag 200. When the power supply is turned on and operating properly, the control signal may be a logical high, which enables the suppressible RFID tag 200 to respond to queries from a tag reader. When the power supply or the mains power fails, the control signal may be a logical low, which suppresses the output of the suppressible RFID tag 200, effectively preventing the suppressible RFID tag 200 from responding to queries from the tag reader 460.

Figure 5:
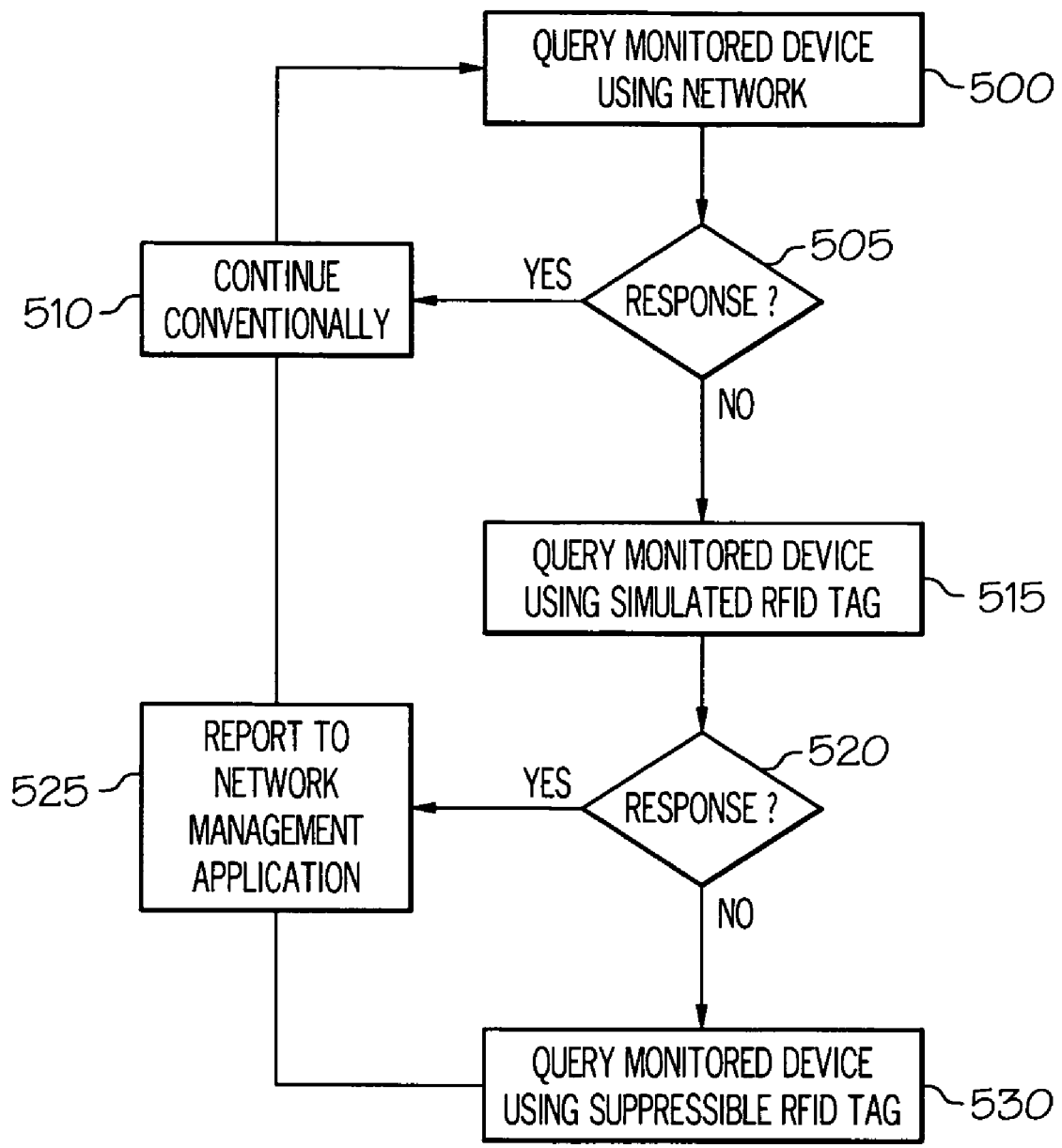
FIG. 5 is a flowchart that shows aspects of a method for managing devices attached to networks.

FIG. 5 shows aspects of a method for managing a device such as monitored device 400 attached to a network such as network 405. To determine the status of the monitored device 400, the network management application 410 queries the monitored device 400 for status information using the network 405 (block 500). If the network management application 410 receives a useable response from the monitored device 400 (block 505, yes), the process continues (block 510) according to the conventions of the network management application 410, and the method returns when appropriate to query the managed device 400 again (block 500).

Otherwise (i.e., the network management application 410 does not receive a useable response from the monitored device 400; block 505, no), the network management application 410 may instruct the edge controller 450 to query the managed device 400 for status information using the tag reader 460 and the simulated RFID tag 300 (block 515).

If the edge controller 450 receives useable status information from the simulated RFID tag 300 through the tag reader 460 (block 520, yes), the edge controller 450 reports the status information, or information derived from the status information, to the network management application 410 (block 525). The process then continues (block 510) according to the conventions of the network management application 410, and the method returns when appropriate to query the managed device 400 again (block 500).

Otherwise (i.e., the edge controller 450 does not receive useable status information from the simulated RFID tag 300 through the tag reader 460; step 520, no), the network management application 410 may instruct the edge controller 450 to query the monitored device 400 for status information using the tag reader 460 and the suppressible RFID tag 200 (block 530). The edge controller 450 reports any status information received from the suppressible RFID tag 200, or reports information derived therefrom, or reports the lack of a response, to the network management application 410 (block 525). The method then returns when appropriate to query the managed device 400 again (block 500). Responsive to the status information reported or not reported in block 525, the network management application 410 may generate a network management alert.

Although the foregoing has described methods, computer program products, and systems for network management using suppressible RFID tags, the description of the invention is illustrative rather than limiting; the invention is limited only by the claims that follow.

We claim:

1. A method for managing a device connected to a network, said method comprising querying the device using the network, querying the device using a simulated RFID tag, and querying the device using a suppressible RFID tag to determine status information about the device.

2. A method for managing a device connected to a network, comprising:
   querying the device for status information using the network;
   if status information is not received responsive to querying the device using the network, querying the device for status information using a simulated RFID tag; and
   if status information is not received responsive to querying the device using the simulated RFID tag, querying the device for status information using a suppressible RFID tag.

3. The method of claim 2, further comprising generating a network management alert responsive to status information reported by the simulated RFID tag.

4. The method of claim 2, further comprising generating a network management alert responsive to status information reported by the suppressible RFID tag.

5. A computer program product for managing a device connected to a network, the computer program product comprising a computer readable medium having computer readable program code tangibly embedded therein, said computer readable program code comprising:
   computer readable program code configured to query the device for status information using the network;
   computer readable program code configured to query the device for status information using a simulated RFID tag if status information is not received responsive to querying the device using the network; and
   computer readable program code configured to query the device for status information using a suppressible RFID tag if status information is not received responsive to querying the device using the simulated RFID tag.

6. The computer program product of claim 5, further comprising computer readable program code configured to generate a network management alert responsive to status information reported by the simulated RFID tag.

7. The computer program product of claim 5, further comprising computer readable program code configured to generate a network management alert responsive to status information reported by the suppressible RFID tag.

8. A system for managing a device connected to a network, said system comprising means for monitoring status of the device using the network; means for receiving status information about the device reported by a simulated RFID tag; and means for receiving status information about the device reported by a suppressible RFID tag.

9. The system of claim 8, wherein the means for receiving status information about the device reported by a simulated RFID tag queries the device for status information using the simulated RFID tag if the means for monitoring status of the device using the network is unable to reach the device using the network.

10. The system of claim 9, wherein the means for receiving status information about the device reported by a suppressible RFID tag queries the device for status information using the suppressible RFID tag if the means for monitoring status of the device using the simulated RFID tag is unable to reach the device using the simulated RFID tag.

11. The system of claim 8, further comprising a plurality of tag readers for reading status information provided by the simulated RFID tag and the suppressible RFID tag, and at least one edge controller for receiving status information read by the plurality of tag readers and passing status information to a network management application.

12. The system of claim 11, wherein the edge controller comprises a processor that executes a network management application program that provides the means for monitoring status of the device using the network, the means for receiving status information about the device reported by a simulated RFID tag, and the means for receiving status information about the device reported by a suppressible RFID tag.

* * * * *